R. H. WELLS.
Trap for Protecting Fruit, &c., from Insects.
No. 213,719.   Patented Mar. 25, 1879.
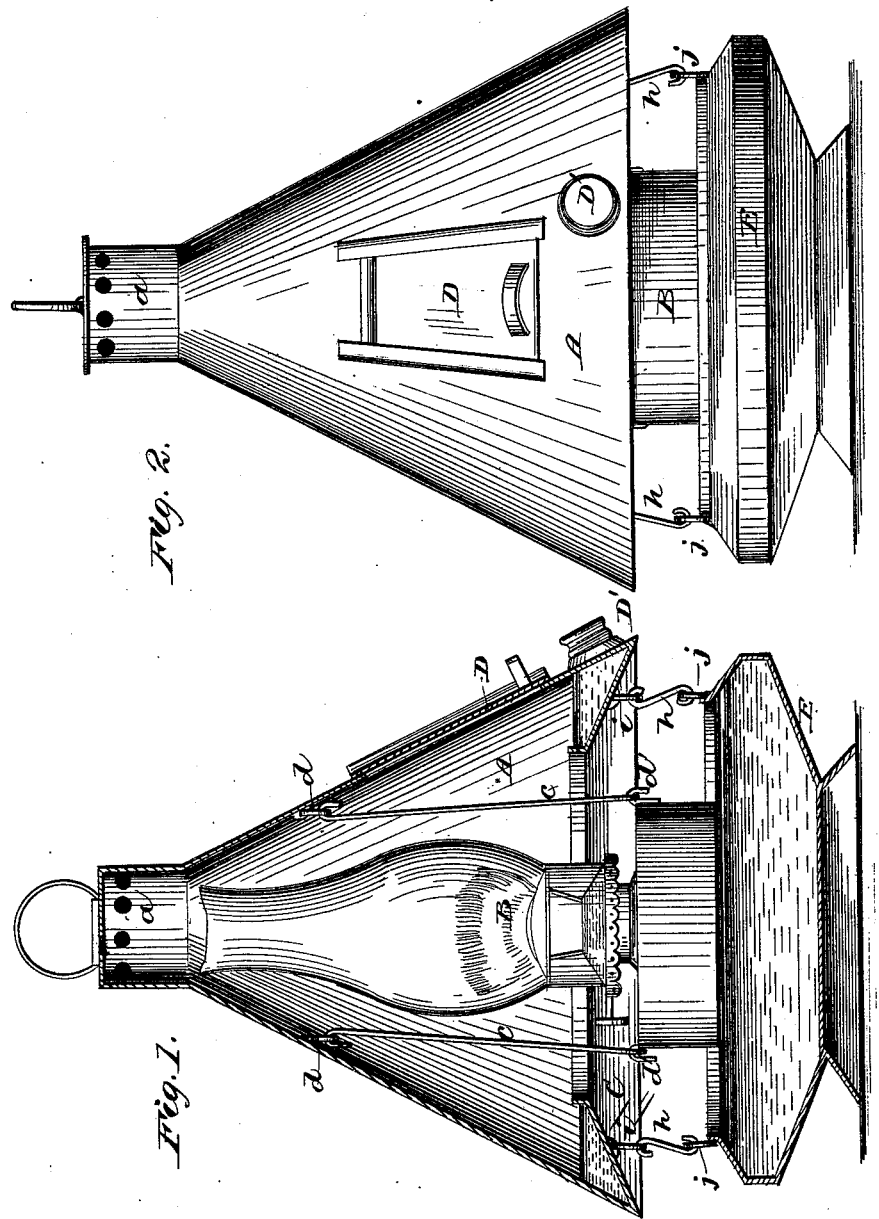

UNITED STATES PATENT OFFICE.

RICHARD H. WELLS, OF CALIFORNIA, (FLAT P. O.,) OHIO.

IMPROVEMENT IN TRAPS FOR PROTECTING FRUIT, &c., FROM INSECTS.

Specification forming part of Letters Patent No. 213,719, dated March 25, 1879; application filed August 8, 1878.

*To all whom it may concern:*

Be it known that I, RICHARD H. WELLS, of California, (Flat P. O.,) in the county of Pike and State of Ohio, have invented certain new and useful Improvements in Fruit and Bee Protectors; and I do hereby declare that the following is a full, clear, and exact description of the invention, which will enable others skilled in the art to which it appertains to make and use the same, reference being had to the accompanying drawings, and to the letters of reference marked thereon, which form a part of this specification, and in which—

Figure 1 is a vertical central section of my improved fruit and bee protector, and Fig. 2 is a side elevation of the same.

The same part in the two figures is denoted by like letters.

This invention relates to certain improvements in that class of devices termed "fruit and bee protectors;" and it consists in the arrangement of two receptacles, one suspended from the other, and of peculiar construction, a lamp being hung within one and above the other, substantially as hereinafter more fully set forth.

In the drawings, A refers to a conoidal or other suitably-shaped receptacle, perforated in its dome $a$, for the emission of smoke, &c., from the within-suspended lamp B. The lamp B is suspended or hung by means of rods $c\ c$, hooking into eyes or rings $d\ d$ in the upper part of the receptacle A, and having eyes at their lower ends, into which are inserted hooks $d'$ upon the sides of the lamp, preferably of tin.

The flaring or lower end of the receptacle A is provided with an inwardly and upwardly inclined flange or rim, C, which serves, in connection with the sides of the receptacle A, to form a vessel for holding oil or water into which to drown or kill the attracted and falling insect, crippled by the heat of the lamp.

To enable the receptacle to more thoroughly reflect the light of the lamp, it may be lined with galvanized iron or other suitable material.

A door, D, large enough to adjust the chimney to light the lamp and to fill conveniently the upper and lower vessel, is provided to the receptacle A.

The screw-cap-covered opening D', formed in part by the flange or rim C, is for the purpose of expelling the liquid and insects when emptying and cleansing the vessel, and the door D is opened during the process of filling the vessel to admit light upon the fluid.

From the inner edge of the rim C is suspended a second receptacle, E, which may be likewise filled with oil or water, for the destruction of the disabled insects failing to fall into the vessel C.

The receptacle E is hung or suspended in position by means of S-shaped hooks $h\ h$, hooked into rings $i\ i$, attached to the receptacle A, and into rings $j\ j$ of the lower receptacle, E.

It will be observed that, the lighted lamp being suspended within and near the open bottom of the receptacle A, and in proximity with the opening between it and the lower receptacle, E, a strong ray of light will be emitted at that point, and thus attract the insects, which, upon entering the receptacle, will, as already intimated, be crippled or overcome by the heat of the lamp, and fall into the reservoirs below, filled with liquid, and be drowned, as aforesaid.

This device hung in an apiary, it will also be seen, will attract stinging or other insects from the bees, or prevent them from entering the hive or hives, and also thus serve to protect bees.

Having thus described my invention, I claim and desire to secure by Letters Patent of the United States—

1. The receptacle A, having its dome or apex provided with a series or number of smoke-emitting apertures, and provided with rings $d$ and rim C, in combination with the within-suspended lamp B, having rods $c\ c$, provided with hooks or eyes, and lower suspended receptacle, E, hung from the receptacle A by hooks and eyes or rings, substantially as and for the purpose set forth.

2. The receptacle A, having door D, screw-capped opening D', and hooks $h\ h$, in combination with lamp B and receptacle E, substantially as shown and described.

3. The receptacle E, having rings $j\ j$, in combination with hooks $h\ h$ and receptacle A, with rim C and lamp B, substantially as shown and described.

In testimony that I claim the foregoing as my own I affix my signature in presence of two witnesses.

RICHARD H. WELLS.

Witnesses:
J. W. GORDON,
DAVID A. GORDON.